(12) United States Patent
Beloch et al.

(10) Patent No.: US 7,172,247 B2
(45) Date of Patent: Feb. 6, 2007

(54) MOTOR VEHICLE SEAT SYSTEM, CONTROL ARRANGEMENT, ACTUATING ARRANGEMENT, AND PROCESS FOR CONTROL OF A LUMBAR ADJUSTMENT DEVICE OF A MOTOR VEHICLE SEAT

(75) Inventors: Klaus Beloch, Michelau (DE); Alexander Woller, Kürnach (DE); Ingo Carl, Gochsheim (DE); Michael Forkel, Coburg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 187 days.

(21) Appl. No.: 10/636,292

(22) Filed: Aug. 7, 2003

(65) Prior Publication Data

US 2005/0052060 A1   Mar. 10, 2005

(30) Foreign Application Priority Data

Aug. 7, 2002   (DE) ........................... 202 12 142 U

(51) Int. Cl.
*A47C 7/46* (2006.01)
(52) U.S. Cl. .............................. 297/284.7; 297/217.3; 297/284.8
(58) Field of Classification Search ............. 297/284.4, 297/284.1, 284.7, 284.8, 217.3, 463.1; 701/36, 701/49; 601/58, 86, 98; 318/590, 567, 460
See application file for complete search history.

(56) References Cited

U.S. PATENT DOCUMENTS

| | | | |
|---|---|---|---|
| 4,655,505 A | 4/1987 | Kashiwamura et al. | |
| 4,944,554 A | 7/1990 | Gross et al. | |
| 5,120,109 A | 6/1992 | Rangoni | |
| 5,127,708 A * | 7/1992 | Kishi et al. | ............... 297/284.1 |
| 5,129,704 A * | 7/1992 | Kishi et al. | ............... 297/284.1 |
| 5,243,267 A | 9/1993 | Ogasawara | |
| 5,254,924 A * | 10/1993 | Ogasawara | ................. 318/590 |
| 5,523,664 A | 6/1996 | Ogasawara | |
| 5,697,672 A | 12/1997 | Mitchell | |
| 5,812,399 A * | 9/1998 | Judic et al. | .................... 701/49 |
| 5,816,653 A * | 10/1998 | Benson | ..................... 297/284.4 |

(Continued)

FOREIGN PATENT DOCUMENTS

DE   689 02 020 T2   1/1990

(Continued)

OTHER PUBLICATIONS

European Search Report for Application No. 03017727.3, dated Aug. 18, 2004, in the name of Brose Fahrzeugteile GmbH & Co. KG, Coburg.

*Primary Examiner*—Milton Nelson, Jr.
(74) *Attorney, Agent, or Firm*—Christie, Parker & Hale, LLP

(57) ABSTRACT

A motor vehicle seat system, control arrangement, actuating arrangement, and process are used to control a lumbar support device of a motor vehicle seat. The lumbar adjustment device has a first drive for adjustment in a first adjustment direction and a second drive for adjustment in a second adjustment direction. The adjustment directions differ from each other. A first adjustment position is ascertained in the first adjustment direction and the drive movement of the second drive is controlled as a function of at least one of the first adjustment position and the temporal change in the first adjustment position.

31 Claims, 4 Drawing Sheets

U.S. PATENT DOCUMENTS

| | | | |
|---|---|---|---|
| 6,049,748 A * | 4/2000 | Newman et al. | 701/49 |
| 6,213,553 B1 | 4/2001 | Ftiz | |
| 6,220,667 B1 | 4/2001 | Wagner | |
| 6,339,302 B1 * | 1/2002 | Greenbank et al. | 318/103 |
| 6,412,868 B1 | 7/2002 | Küster et al. | |
| 6,805,680 B2 | 10/2004 | Klingler | |

FOREIGN PATENT DOCUMENTS

| | | |
|---|---|---|
| DE | 690 31 122 T2 | 5/1991 |
| DE | 93 07 689 U1 | 10/1993 |
| DE | 694 11 432 T2 | 10/1994 |
| DE | 43 13 757 A1 | 11/1994 |
| DE | 692 30 623 T2 | 7/1996 |
| DE | 195 42 659 A1 | 5/1997 |
| DE | 195 47 964 A1 | 6/1997 |
| DE | 196 49 149 A1 | 5/1998 |
| DE | 198 29 831 A1 | 1/2000 |
| DE | 199 39 056 A1 | 2/2001 |
| DE | 199 52 560 C2 | 5/2001 |
| DE | 199 61 172 A1 | 6/2001 |
| DE | 199 46 156 C2 | 8/2002 |
| EP | 0 619 968 A1 | 10/1994 |
| EP | 0 698 360 B | 2/1996 |
| EP | 0 698 360 B1 | 2/1996 |
| WO | WO 91/06082 | 5/1991 |
| WO | WO 92/14387 | 9/1992 |
| WO | WO 95/19123 | 7/1995 |
| WO | WO 96/17744 | 6/1996 |

* cited by examiner

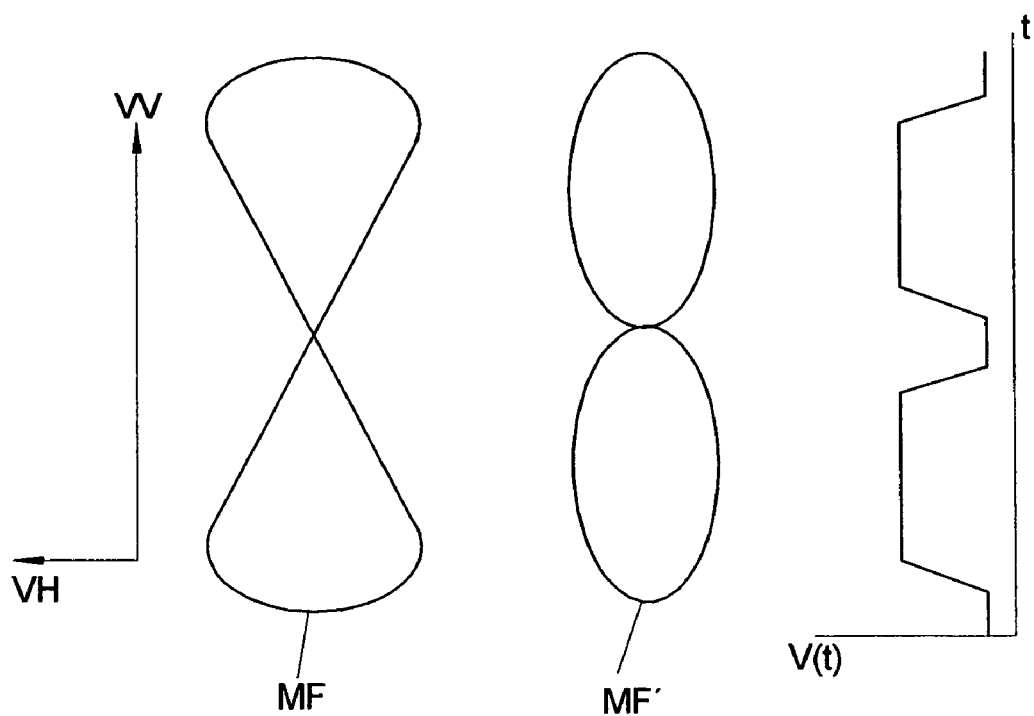

MOTOR VEHICLE SEAT SYSTEM, CONTROL ARRANGEMENT, ACTUATING ARRANGEMENT, AND PROCESS FOR CONTROL OF A LUMBAR ADJUSTMENT DEVICE OF A MOTOR VEHICLE SEAT

CROSS REFERENCE TO RELATED APPLICATION

This application claims priority of German patent application number 202 12 142.9, filed Aug. 7, 2002.

FIELD OF THE INVENTION

The present invention relates to a motor vehicle seat system, a control arrangement, an actuating arrangement, and a process for the control of a lumbar adjustment device of a motor vehicle seat.

BACKGROUND

The use of supports in motor vehicle seats which can be shaped according to anatomic specifications has been steadily increasing. In addition to supports which allow for a position of the thighs so as to reduce maximum pressure, the so-called lumbar support devices have particular significance. As a result of the preferred forward leaning posture of the seat occupant, the natural, forward concave shape of the lumbar column is replaced by a substantially convex one curved toward the rear, which causes, in addition to quicker fatigue, an undesirable distortion of the intravertebral disks. In order to avoid such an undesirable posture, lumbar supports are provided in motor vehicle seats. Such lumbar support devices must be designed to be adjustable by height in order to fit different back lengths and thus different levels of the lumbar area. Usually, such lumbar support devices are covered by the cushioning of the motor vehicle seat. This cushioning may be filled with foam rubber.

Various technically differently designed lumbar support devices are known. One form provides an inflatable cylinder in the lumbar area. An example of this pneumatic lumbar adjustment is disclosed in U.S. Pat. No. 4,655,505. Multiple air chambers can be controlled sequentially via corresponding valves. The pressure in the air chambers can be decreased by means of an exhaust valve or increased by means of a pumping device, and measured by means of a pressure sensor.

Another lumbar support is designed such that two hinged parts can be moved toward or away from each other along a guide. A variably designed curvature is not possible. As a result, a support for the lumbar area is provided in a narrow range at its highest position only, thereby supporting no more than one or two vertebra. An example of this such a lumbar support is described in WO 95/19123.

Another lumbar support design has a substantially planar support part, whereby the plane is provided either with perforations or individual support elements arranged next to each other. These elements may taper from the middle towards the outside. This planar support part can be moved by moving its two end areas towards each other, such that a curvature thereof may be obtained. By forming different thicknesses according to EP 0 698 360 B, a desired asymmetric shape that substantially corresponds to a lumbar curve can be achieved.

As a rule, the above cited lumbar support devices are connected to a frame, for example the back part of a car seat. In that embodiment, the support part of the lumbar support is connected to an additional frame that has two external supports running substantially parallel to the spinal column, along which gliding elements are moveable or to which lateral supports for a curvable support part are stationarily attached.

From WO 95/191123 a lumbar support is known that is not provided with a curvable support part but with two arms hinged to each other. The ends of the arm parts can be moved relative to each other and the other ends are connected via a rail with two cylindrical recesses.

In addition to manual adjustment of such lumbar support devices (also called spinal supports or lordotic supports), electrically or pneumatically adjustable lumbar support adjustment devices are known that allow for the electrically controlled setting of a desired shape. These electrically controlled adjustments are operated, for example, by a button or a switch. The adjustment in said lumbar supports depends on their mechanical design.

Such electrical control of a lumbar adjustment device is known from DE 43 13 757 A1 and U.S. Pat. No. 5,243,267. The electrical control enables the obtaining of a massage effect by means of a motor repeatedly effecting a back-and-forth movement of the lumbar plate within a predefined time frame, in addition to the manual control of the desired support position.

SUMMARY

The object of the present invention is to provide a motor vehicle seat system, a control arrangement, an actuating arrangement, and a process for the control of a lumbar adjustment device of a motor vehicle seat presenting the utmost improved comfort functions while making use of a simple mechanical design.

A process for the control of a lumbar adjustment device of a motor vehicle seat is provided. In this process an adjustment drive movement is simultaneously and automatically controlled in a first adjustment direction and a second adjustment direction. The automatic control is effected preferably by a control device (for example by running a program), consequently making permanent manual operation such as actuating an operating switch unnecessary. The lumbar adjustment device has a first drive for adjustment in a first adjustment direction and a second drive for adjustment in a second adjustment direction. In principle various types of drives, such as pneumatic or hydraulic, may be used. However electric drives are preferably used, particularly electrically switched electromotors. The adjustment device may be of any type of drive, e.g., arc shaped, rotational or a composite adjustment possibility along an adjustment track. Linear adjustment by a drive is preferred however. The adjustment directions differ from each other. Accordingly, the adjustment by the first drive results in a different change of the contour of the back of the seat than the adjustment by means of the second drive.

An advantageous further development of the invention provides that an adjustment movement is composed of the drive movements in the first adjustment direction and the second adjustment direction. Advantageously, the lumbar support of the lumbar adjustment device is hereby adjustable in at least the height of the back of the seat by the first drive and the depth of the back of the seat by the second drive. In this case, the support position is defined by the respective current adjustment positions in the first adjustment direction and in the second adjustment direction. The composite adjustment movement is obtained by coordinating the adjustment in the first adjustment direction with the adjustment in the second adjustment direction. In the simplest case, the coordination takes place via the adjustment time. By way of example, an adjustment direction, an adjustment speed or an adjustment acceleration may be associated at each adjustment point in time with the relevant drive.

A preferred further development of the invention provides a coordination between the drive movements in which one drive movement depends on another. The drive movement of the second drive may be controlled as a function of a first adjustment position and/or the temporal change of this first adjustment position. The dependency may be programmed as a permanent coordination. It is particularly advantageous, however, if this dependency function is variable based on additional conditions, in particular parameters or characteristic values. The temporal change in the adjustment position is preferably the adjustment speed or the adjustment acceleration of the first drive. If, for example, the second drive serves to adjust the lumbar support in the depth of the back of the seat and the first drive to adjust the lumbar support in the height of the back of the seat, the depth of the back of the seat is controlled as a function of the current position of the height of the back of the seat.

Advantageously, in the process for the control of the lumbar adjustment device, the first adjustment position is ascertained in the first adjustment direction. The ascertaining of the adjustment direction when using an electrically switched electromotor as a drive takes place preferably by evaluating the control signals. If a mechanically switched electromotor is used as a drive, the adjustment position is preferably ascertained from the ripple of the drive current caused by the mechanical switching. A preferred embodiment of this further development of the invention provides that a sensor system is used for sensing the adjustment position. This positional sensor system is effectively connected to the drive, preferably using a mechanical coupling. The position sensor allows a transformation of the adjustment position of the mechanical adjustment path into electronically exploitable signals, for example a voltage signal correlating with the adjustment position.

In an exemplary embodiment, the sensor system can sense the drive movement of the electromotor, whereby a transmitter (such as a multi-pole ring magnet, aperture disk or a capacitive signal emitter) is affixed on the drive axle of the electromotor that is connected to the sensor element (such as a Hall sensor, optical component or the like). However, it is particularly advantageous if a direct measuring system is used as a sensor system, whereby the adjustment path is detected by means of a sensor from which the respective current adjustment position can be read. Such a direct measuring sensor system comprises a resistor (potentiometer, slide potentiometer) variable along the adjustment path. In a particularly advantageous embodiment, the direct measuring sensor system is a foil sensor that extends over at least a part of the adjustment path.

In an advantageous further embodiment of the invention, a second adjustment position is ascertained in the second adjustment direction. The ascertaining of the second adjustment position can take place in the same manner as in the ascertaining of the first adjustment position. Here, the drive movement of the first drive is preferably controlled as a function of the second adjustment position and/or the temporal change in the second adjustment position. Due to this mutual dependency of the control of the relevant drive on the adjustment position or the temporal change in this adjustment position, adjustment-position dependent and freely programmable movement processes for the adjustment of the lumbar support can be controlled.

In a particularly advantageous embodiment of the two previous further developments of the invention, a coordination instruction is read out from storage. Such a coordination instruction may comprise an equation which uses the respective adjustment position and/or its temporal change for its input variable. Alternatively, a coordination table or a coordination identification field where the intermediate values are interpolated may be used. Storage may be provided by fixed programmed non-volatile storage (ROM) or programmable storage (RAM/EEPROM) that allows for the adaptation or variation of the coordinating instruction either by the user or automatically during operation.

Furthermore, using the coordinating instruction, a drive control variable for the dependent control is ascertained from the adjustment position and/or the temporal change of this ascertained adjustment position. In one embodiment the drive control variable is the scanning ratio of a pulse width modulated signal (PWM) relative to the clocked voltage of the electromotor. Alternatively, a voltage signal or the rotational frequency of an electrically switched motor may be read out.

An advantageous embodiment of the invention provides that at least one of one direction of movement, the speed of movement and acceleration of motion of the first adjustment drive is associated with an adjustment position and/or a temporal change of the adjustment position of the second drive. As a result, the coordination instruction can not only control the instantaneous performance of the motor, but also its temporal processes, comprising acceleration and braking processes.

Various movement properties may be controlled by means of a programmable computing unit, preferably a microcontroller. In order to also allow for a highly differentiated analysis of a movement, at least three advantageous embodiments (that may also be combined) may be used.

In the first of these embodiments, a direction of movement of the first adjustment drive may be associated using the programmable computing unit with at least one of a position, an adjustment speed and an adjustment acceleration, or a combination thereof. For example, upon reaching one or several positions in the second direction of adjustment of the second adjustment drive, the direction of movement of the first adjustment drive is reversed. In this example, a loop-shaped overall movement of the lumbar adjustment device that has one or a plurality of stationary or moving loops is generated.

The second of these embodiments provides an adaptation of the programmable computing unit such that a speed of movement of the first adjustment drive can be associated with at least one of a position, a speed of adjustment, and an acceleration of adjustment of the second adjustment drive, or any combination thereof. The speed of movement of the first adjustment drive may, for example, be reduced or increased by controlling the drive current for a mean position range of the second direction of adjustment.

In addition to controlling the direction of movement and the speed of movement of the first adjustment drive, in some cases a dependency of the movement acceleration is also desirable. For example, the acceleration in the second direction of adjustment can be adapted to the acceleration in the first direction of adjustment. By using the programmable computing unit an acceleration of movement of the first adjustment drive can be associated with a position, a speed of adjustment, an acceleration of adjustment or a combination thereof of the second adjustment drive.

In addition to the adjustment of the lumbar support with regard to seat back depth and seat back height, a further advantageous embodiment provides that the lumbar adjustment device has a third drive for adjustment in a third direction differing from the first and second adjustment directions. Here, the drive movement of the third drive is controlled as a function of at least one of the adjustment position and the temporal change in the adjustment position of at least one of the first adjustment direction and the second adjustment direction. For example, using this third adjustment device, the width of the lumbar support or its position within the width of the back of the seat can be controlled.

In a particularly advantageous further development of the invention, at least the drive movement in the first adjustment direction, and the drive movement in the second adjustment direction form a massage pattern. The massage pattern thus includes adjustments in the first adjustment direction and in the second adjustment direction which mutually depend on each other through a coordination instruction. Furthermore, the massage pattern includes the speed at which the massage pattern is run through as well as short-term variations in the speed of adjustment of one or both drives bringing about a massage effect. The massage pattern is run through for the massage for a predefinable period of time. The time period, massage pattern and massage intensity can be predefined by the manufacturer, or in a particularly advantageous embodiment, by the user. Accordingly, the dynamics, the massage pauses, the massage amplitude, the massage zones or the like can be changed.

In a particularly advantageous embodiment of this further development of the invention, the massage pattern is altered as a function of one or a plurality of characteristic values. Such values comprise the seat occupant weight, massage time, trip duration, vehicle speed and its temporal change. Analysis of these characteristic values may provide insight into such phenomena as road conditions, movement and fatigue of the seat user. It is advantageous to analyze values such as for example the frequency and extent of operation of the steering wheel, distance of the gas pedal operating path, clutch pedal operation, bad road detection, vehicle temperature, and user identification, by means of the code signature of the motor vehicle key or activation of an actuation device.

In a particularly advantageous embodiment of the invention, the force acting on the drive is determined from at least one drive movement. Depending on the hardness of the cushioning and the position of the seat user (which may change continuously during the trip), an automatic adaptation of the massage pattern or of the optimal support point of the lumbar region may be desirable. In areas of the back of the seat upon which the body of the occupant exerts a larger force, decreasing or limiting the automatic adjustment movement may be desirable. In an advantageous embodiment of this further development of the invention, the back contour of the seat is determined by ascertaining the force acting on the drive. The back contour provides anatomic input data that can be used for optimized automatic setting of the lumbar support and corresponding adjustment devices of the motor vehicle seat, for example such as the head rest. Accordingly, at least one of a contour-specific adjustment position, a contour-specific massage pattern and a contour-specific predefinable duration of the massage can be determined from the back contour.

The invention furthermore includes a control device that is adapted for the control of a lumbar adjustment device according to the above described process. The adjustment path of the two adjustment directions is in each case delimited by two mechanical stops, between which an adjustment by the drive takes place. The adjustment path may be guided linearly by means of guide elements. An arc-shaped or complex guide track, a rotational path or an adjustment path composed of a variety of movement possibilities can also be designed.

A first position sensor is advantageously provided within the adjustment path to ascertain an adjustment position. The control device allows the analysis of sensed position values and control of the drive dependent on this analysis. Accordingly, the control device is designed to reverse the movement of the adjustment by the first drive when a sensed position value corresponds to a return point, in particular one associated with a mechanical stop. The return point is a value or a range of values with which the movement reversal is positionally associated.

The control device here may be provided with analog, but is preferably provided with digital components (for example a microcontroller). These components enable the running of a process for the control of the adjustment movement of the lumbar adjustment device of the motor vehicle by means of a program. The element to be adjusted is adjusted between two mechanical stops. In order to protect these mechanical stops, the element to be adjusted stops just short of the stops.

In a preferred embodiment, the position value to be correlated with the adjustment position of the position sensor is continuously ascertained. The drive is controlled to reverse the direction of movement when the position value ascertained corresponds to a reverse point. The reverse point can be predefined, or changed by a program. When this value or value range of the return point is reached, the automatic control of the reverse movement takes place. Specifically, the drive of the previous direction of movement is stopped and subsequently controlled in the opposite direction. Preferably, the drive is turned off for a predefinable time period between stopping and moving the element to be adjusted in the opposite direction.

An alternative embodiment provides a control device of a lumbar adjustment device of a motor vehicle in which the adjustment device has a first drive for the adjustment in a first adjustment direction and a second drive for the adjustment in a second adjustment direction. The two adjustment directions differ from each other. Based on this difference and the two independently controllable drives, the geometry of the seat can be controlled, particularly as a function of time. An adjustment movement of the lumbar support here is not limited to a linear adjustment; arc-shaped, rotational and compound adjustment movements can be controlled as well.

A first position sensor serves to ascertain a first adjustment position in the first adjustment direction. The position sensor is operationally connected with the first drive such that the movement of the element to be adjusted in the first adjustment direction, or alternatively the drive movement of the first drive, is mapped to a position value. In a preferred embodiment the mapping is continuous. This position value is evaluated by an electronic control of the control device. The control, in particular a microcontroller of the control device, is provided for the control of the drive movement of the second drive as a function of at least one of a first sensed position parameter, an adjustment speed and an acceleration of the first drive. The adjustment movements of the first adjustment device and of the second adjustment device are electronically coupled using an electronic control device. The adjustment movements of the first adjustment device and of the second adjustment device are preferably mechanically moveable independent of each other.

The electronic control of the control device enables an adjustment process that is preferably used for a freely configurable massage function of the lumbar adjustment device. Movement interdependencies of the independently controllable drives are defined in the process of controlling the lumbar adjustment device of the motor vehicle seat. The element to be adjusted is moved by a first drive in a first direction of adjustment and by a second drive in a second direction of adjustment, said second direction of adjustment differing from the first direction of adjustment. A first adjustment position in the first adjustment direction is ascertained. The drive motion is controlled as a function of the ascertained first adjustment position or of an ascertained rate of adjustment in the first direction of adjustment. The drive movement can, for example, be controlled with regard to the direction of the drive, the drive speed or the positive or negative drive acceleration.

If the adjustment functionality of the lumbar adjustment device is to be extended, in an advantageous further development of the control device a third drive for the adjustment of a third direction of adjustment is used. The third direction of adjustment differs from the first direction of adjustment and a second direction of adjustment. This third adjustment device is, for example, a rotational adjustment device $\phi$ of the cylinder coordinates which allows for a combination with a rotational movement. This can advantageously be used for a rotational massage function controlled by a control device. Alternatively, the third direction of adjustment can also extend over the width of the seat.

In order to adapt the interdependencies of the movement of adjustment to the user and the mechanical design of the motor vehicle seat, a programmable computing unit for the control device is provided in a further embodiment. The unit is designed and adapted at least for the freely programmable dependency of one adjustment movement in the first adjustment direction on an adjustment movement of the second adjustment direction. Accordingly and particularly advantageously, the computing unit of the control device is programmable and at least one massage pattern is programmable and storable. In addition, additional interdependencies may be programmed. Thus, for example, even the second movement of adjustment is additionally a function of the first movement of adjustment or another movement of adjustment of the lumbar adjustment device, or another movement of adjustment of the motor vehicle seat. Because of the programmability, a plurality of the massage patterns can advantageously be changed by the user and stored. In this case, the massage pattern is a programmable movement of the lumbar adjustment device. The massage patterns can be adapted to the environmental conditions of the motor vehicle seat, i.e., for example, to the hardness of the cushioning.

In addition, provision is advantageously made for the massage pattern to vary as a function of a characteristic value. This characteristic value may comprise a measured value such as the weight of the seat occupant, a control parameter or data from a bus such as trip duration.

In order to improve the comfort of this massage, and in order to make the user's preferred massage dependent on the wishes of the user, an advantageous further development of the invention has an input device capable of manually starting a programmable adjustment movement cycle of the lumbar adjustment device. In addition to starting the cycle, the input device can also make it possible to turn off the massage function. In one embodiment, the input device is integrated into the seat control device used to control the seating position.

Different users of the motor vehicle seat may prefer different types of massage. To take accommodate this, in an embodiment of the invention at least one of the various massage patterns is selectable. Preferably, the selectable massage patterns can be configured to be alterable and storable by the user. In addition, these massage patterns may be coordinated with a user identification stored in a motor vehicle key for example.

To enable smoother action of the lumbar support adjustment device when in the vicinity of the movement limiting stops, in one embodiment of the invention the control device is designed and adapted for the braking of the first drive, and for the acceleration of the first drive in the reverse direction when the position value sensed has reached the reverse point. To this end a semi-conductor switch (such as a field effect transistor or a full bridge) is provided. In one embodiment the semi-conductor switch is controlled using a pulse width modulated control signal from a microcontroller that controls or regulates the drive energy.

An advantageous process sequence in a control program enables continuous comparison between the current sensed position value and one or a plurality of values associated with the reverse point. If the comparison yields a positive result, the control means reacts to having reached the reverse point. To this end, the drive voltage and/or the drive current is controlled by means of a ramp or any other falling function until the drive comes to a halt. Subsequently, the drive is driven in the opposite direction and the drive voltage and/or drive current is controlled "up" to its nominal value through a rising function. Upon reaching the reverse point, after halting from the direction of the corresponding stop, no reversal of direction takes place. However, a different dependent control is possible, such as control using rate of speed, as a function of this reverse point.

In an advantageous embodiment, at least one reverse point is provided within the adjustment path between two mechanical stops as position parameter. This reverse point is positioned relative to one of the mechanical stops such that the movement of adjustment results in a movement energy lower than the load capacity of this mechanical stop effecting the mechanical stop. Therefore, the movement of adjustment is preferably stopped before reaching this mechanical stop. Alternatively to having the reverse point directly adjacent to one of the stops, the reverse point may also be arranged at a distance from the stop if it is desirable that the path of adjustment be limited. Preferably, the control means are designed such that the reverse point has a dual function as a protective stop, whereby in a manual or automatic adjustment, the protective stop enables an automatic reduction of the adjustment energy as a function of the specific adjustment position. In particular, the protective stop enables a stopping of the movement of adjustment within the zone of this reverse point acting as a protective stop.

In one embodiment, means for storage and selection of one or a plurality of memory positions are provided in order to allow an automatic adjustment to the desired position. Based on the memory position data, the massage function can advantageously be adapted to the memory position associated with the body contour of the occupant.

In a further embodiment, if the adjustment path is to be limited by the user or by using additional computations the reverse point is programmable. The reverse point depends on parameters or is entered in storage as a fixed value.

In principle, limit position switches can be used. However, limit position switches allow neither the control of a memory position nor measurement of the rate of speed of adjustment. In order to make these comfort functions available, the adjustment position is particularly advantageously directly measurable by the position sensor by mechanically coupling the position sensor to the element of the lumbar adjustment device to be adjusted.

A large variety of measuring devices can be used as directly measuring position sensors. However, they frequently are subject to a high level of wear, leading to a low level of reliability. Nevertheless, in order to directly ascertain the position of the element to be adjusted of the lumbar adjustment device, two advantageous embodiments of the invention are described. In the first embodiment, the position sensor is a foil position sensor that emits a position signal (preferably a sensor voltage) as a function of the adjustment position along the adjustment path. In the second embodiment, the position sensor is a magneto-resistive bridge circuit that works together with a magnetic polarization varying along the adjustment path.

In an alternative embodiment, the position sensor for sensing the position of the reverse point is an optoelectronic component designed to sense the position value associated with the reverse point. In this embodiment, the principle of a light barrier or a reflection associated with the reverse point is used. Through an appropriate coupling two, or a plurality, of reverse points can be detected by means of an optoelectronic component.

A particularly cost-effective embodiment provides a Hall sensor working in cooperation with a magnet as a position sensor. The magnet may be mechanically coupled with the part of the lumbar support device to be adjusted. In a preferred embodiment, the magnet is coupled with the drive axle or a drive element of the driving electromotor of the drive (e.g. the motor axle). The change between the north and south pole of the magnet dependent on the drive movement causes an impulse sequence at the output of the Hall sensors. This impulse sequence is used for the position computation. The control device is designed to count these path dependent impulses of the Hall sensor. The current position of adjustment is determined by the count. The movement is reversed as a function of the position of adjustment determined when the reverse point is reached by means of the determined position of adjustment.

This indirect determination of the position by means of Hall sensors is error prone such that the determined position of adjustment may be different from the true position of adjustment. Although a slight shift may be acceptable, the use of the massage function of the lumbar adjustment device results in a possible progressively worsening shift which may result in repeated adjustment processes into the mechanical stops, and thus to increased mechanical stresses on the lumbar adjustment device.

A preferred and cost effective embodiment provides that in order to improve the control device and to avoid this problem, the control device has a correction means to correct the determined position of adjustment. For this, a detectable significant position may be ascertained and the shift corrected between the determined position of adjustment and the true position of adjustment. Advantageously, for this, detection means are provided on one of the stops to detect blockage of the adjustment.

The following embodiment of the invention is particularly advantageous as a control process. In a first step, the adjustment device is moved into the mechanical stops, and the position of the mechanical stops as well as their distance is ascertained. The subsequent massage adjustment takes place alternatingly until the reverse points (arranged at a distance from the corresponding mechanical stops and which prevent a collision with the stops) are reached. If, in the course of the massage adjustment a shift should take place such that the distance between the reverse point and the mechanical stop is no longer sufficient and the mechanical stop is hit, the stop is detected using the drive current characteristics significant for this stop.

Subsequently, either the determined position of adjustment or the position of the two reverse points is corrected. In order to prevent driving into the stops with high mechanical energy (which would result in damage to the mechanics), in one embodiment a correction of the determined position of adjustment or of the reverse points occurs after a specific number of massage strokes (e.g. fifty massage strokes) by decreasing the drive performance after the reverse point is reached and making the adjustment with low adjustment energy until the stops are reached. In a further embodiment this specific number of massage strokes is a configurable number. The position of the stop is detected by its significant drive voltage characteristics and the determined position of adjustment or the reverse points are aligned accordingly. For the massage function a regulation of the speed or the torque of the drives is also advantageous in addition to simple control.

Because of the numerous possible directions of adjustment in a lumbar adjustment device, a large number of cables is required to control the drives from the seat control device. In order to avoid the expense of these cables, in one embodiment a transmission means is provided for the communication of the massage function via a bus system. To this end the control device may be connected to the seat control device by a LIN bus. In this manner even vehicle extraneous user specific massage data may be read from a data carrier and transmitted via the bus system to the control device.

Another embodiment of the invention provides a device for the actuation of the functions of a lumbar adjustment device having one or a plurality of operating elements. The operating elements are associated with an adjustment in a first direction of adjustment and a second direction of adjustment, and a massage function that includes an automatic movement of adjustment in the first direction of adjustment and in the second direction of adjustment. The actuation device can be part of an input device for the manual start up of a programmable adjustment sequence of the lumbar support. The selection of the desired functionality can also take place by using a speech input. At least one of various massage patterns is selectable by this device. In a further embodiment, this device has an additional operating element by which the massage patterns can be changed and stored by the user.

The lumbar support of a seat of a motor vehicle and the control device for that lumbar support are often arranged at different locations in the motor vehicle. Working together they form a motor vehicle seat system with a lumbar adjustment device, whereby the lumbar support is adjustable at least in the depth of the seat back and in the height of the seat back.

In addition to the disclosed principles and means, the invention also includes the function reversals and substitutions possible for the motor vehicle seat system.

The invention is explained in detail below with reference to exemplary embodiments depicted in the following drawings.

BRIEF DESCRIPTION OF THE DRAWINGS

FIG. 3a and FIG. 3b schematically depicts a massage pattern;

FIG. 3c shows a schematic speed-time diagram for the control;

DETAILED DESCRIPTION

Figure 1:
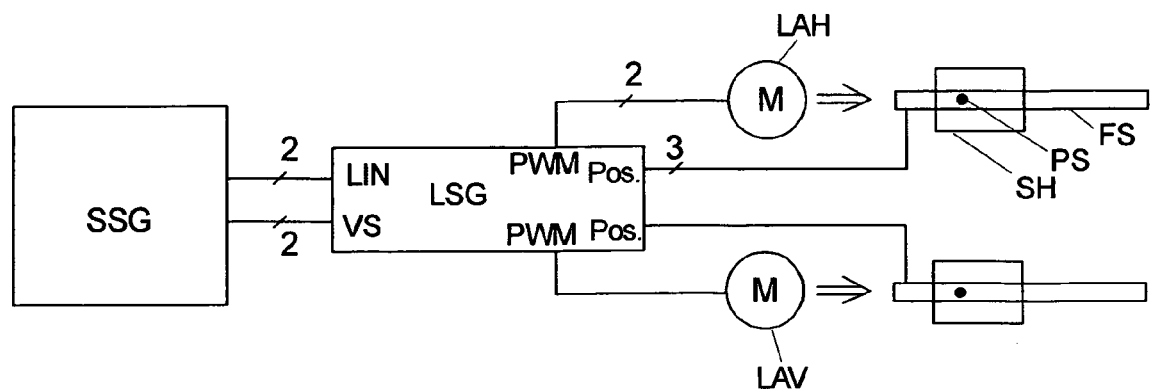
FIG. 1 schematically depicts the electronic circuitry of a lumbar adjustment device connected to a seat control device.

FIG. 1 schematically depicts a control device for a lumbar adjustment device. A lumbar control device LSG is shown connected to a seat control device SSG. The lumbar control device LSG is supplied with a supply voltage VS via two cables. Two additional cables are provided for data transmission between the seat control device SSG and the lumbar control device LSG. In this exemplary embodiment, a LIN-bus is advantageously used for data transmission. Function control commands as well as status data, electrical current management functions and additional parameters of programs can be transmitted via the LIN-bus. Thus, for example, programming of massage patterns (MF, MF', MF'') depicted in the sequence figures is possible via the LIN-bus.

Figure 2:
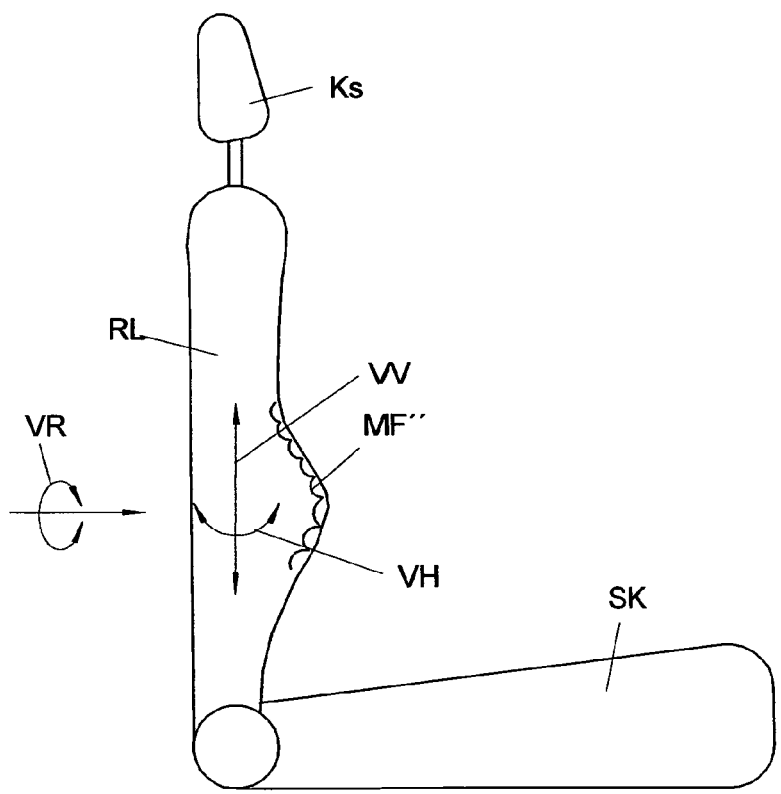
FIG. 2 schematically depicts a motor vehicle seat with three directions of adjustment of the lumbar adjustment device.

The lumbar control device LSG is connected via two driver outputs PWM by two cables with one drive LAH and LAV, respectively, of the lumbar adjustment device. The driver outputs PWM enable pulse modulation of the drive current for two electromotors M. This allows for control of the torque and/or the rotational speed of the motors. The drives LAH and LAV adjust an element of the lumbar adjustment device in two directions VH and VV which differ from one another. As depicted in FIG. 2, the direction VV enables an adjustment movement in the seat back height, (for example inside a seat back RL in the direction of a headrest KS), whereas the direction VH can be designed substantially perpendicular thereto. As such, the lumbar support is accordingly substantially adjustable in the seat back depth as well as height.

In order to sense the movement of the element to be adjusted, foil sensors FS are used that extend along the adjustment path and send a voltage signal proportional to the adjustment position to position detection inputs Pos. of the lumbar control device LSG. A slide SH connected to the element of the lumbar adjustment device to be adjusted has a position pin PS that presses against the foil. At this position, the position pin PS generates, within the foil, a contact between the resistance layer and a pickup element. The pressure point maps the position of the element to be adjusted onto the voltage signal.

FIG. 2 schematically depicts a motor vehicle seat with a seat cushion SK, the seat back RL, and the headrest KS. The lumbar adjustment device is arranged in the seat back RL and has, in this exemplary embodiment of the invention, three adjustment directions VH, VV, and VR. The adjustment direction VV runs in the plane of the seat back RL and enables an adjustment along a part of the length of the spinal column of the user. Here, the design of the adjustment direction VV is linear.

The adjustment direction VH differs from the adjustment direction VV in that, in the exemplary embodiment, it is oriented at an angle to the adjustment direction VV. The adjustment direction VH enables implementation of a forward protrusion of the seat contour by the lumbar support. In the exemplary embodiment depicted, this adjustment occurs along an arc-shaped adjustment path. These two and the following third adjustment direction VR are adjustable, mechanically independent of each other, by their corresponding drives. However, the adjustments are coupled with each other such that these adjustment directions are mechanically linked the same adjustment element of the lumbar adjustment device.

The third adjustment direction VR is designed, in particular, to aid in performing a massage function. It enables a circular, rotational movement of the support element of the lumbar adjustment device which is to be adjusted. Utilized in combination with the other two adjustment directions VV and VH, complex massage patterns can be programmed. Such a complex movement is schematically depicted by a massage pattern MF''', which is also configurable as a function of the previously set position or of any memory position such that the massage pattern of the contour of the seat is adapted in the desired normal position (before and after the massage).

FIG. 3a and FIG. 3b show additional massage patterns MF and MF' for the two adjustment directions VH and VV. These massage patterns can assume extremely diverse shapes within a curvature field, for example, a closed or reversing massage pattern. The depicted massage patterns MF and MF' have the shape of a figure eight (8). The massage pattern MF has a zone with a substantially constant adjustment speed in the adjustment directions VH and VV. This zone lies between two zones that are associated with the reverse points. In these zones however, the adjustment speed is reduced. Thus, the speed in the direction VH is changed as a function of the adjustment position in the adjustment direction VV, by applying a braking force to the respective drive before reaching a reverse point and accelerating again after reversing direction.

Speed is also controlled for the massage pattern shown in FIG. 3b. In the zone of the reverse points the speed of the adjustment direction VV is reduced. In addition, there is a slowing of the speed for roughly half of the adjustment path in the adjustment direction VV. A nominal speed V(t) associated with FIG. 3b is depicted in FIG. 3c as a function of time t. Upon reaching the reverse points, the control is reset, said control being time-dependent or position-dependent. The control in the adjustment direction VH is then reestablished as a function of the sensor-detected adjustment position in the adjustment direction VV.

Figure 5:
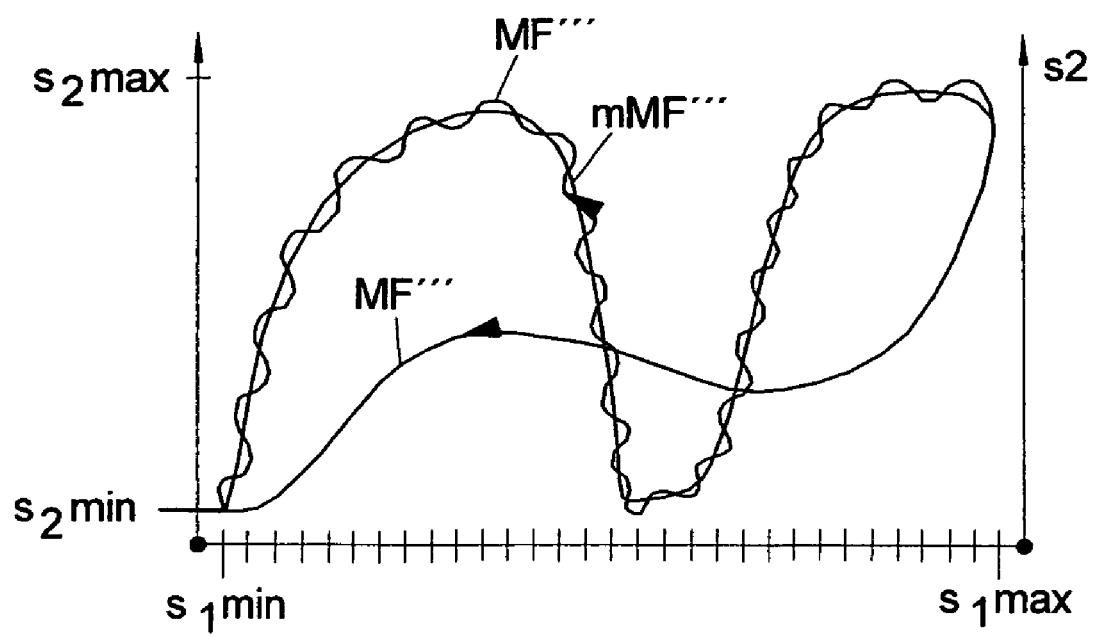
FIG. 5 shows a massage pattern with an overlaid massage frequency.

FIG. 5 schematically depicts a massage pattern MF'''' with a basic pattern mMF'''' overlaid with a massage frequency. An adjustment path s1 in the first adjustment direction of the drive LAV is entered on the ordinate. The adjustment path s1 is delimited by two reverse points s1min and s1max. An adjustment path s2 of the second adjustment direction of the second drive LAH is entered on the abscissa. This is likewise delimited by two reverse points s2min and s2max. These reverse points s1min, s1max, s2min, and s2max can be associated with the two mechanical stops in the respective adjustment direction. However, the maximum adjustment path in the respective adjustment direction can also be delimited by the user offsetting the reverse points s1min, s1max, s2min, and s2max relative to each other such that a reduced automatic adjustment distance and consequently a smaller massage zone in the respective adjustment position result.

The massage pattern MF' is now defined by storing one or a plurality of adjustment position values in the adjustment path s2 in a table used as a coordination instruction for the respective adjustment position value in the adjustment path s1. Which adjustment position value in the adjustment path s2 must be read out at a given time depends on an additional variable. In the exemplary embodiment shown in FIG. 5, the adjustment position value to be read out for the adjustment path s2 depends on the instantaneous direction of the adjustment movement in the adjustment path s1. Consequently, the forward and return path of the massage pattern MF''' as depicted in FIG. 5 are different. On the return path (starting from the start point s1min, s2min to the endpoint s1max, s2max) an additional oscillation is overlaid on the mean value mMF''' of the adjustment in the massage pattern MF'''. This overlaid oscillation of constant or variable frequency provides an additional massage effect. The overlaid oscillation is advantageously one of a periodic or aperiodic oscillation, a sinus oscillation, a square oscillation, or a vibration defined by a Fourier series and loads the mechanical system of the lumbar adjustment device less.

Figure 4A:
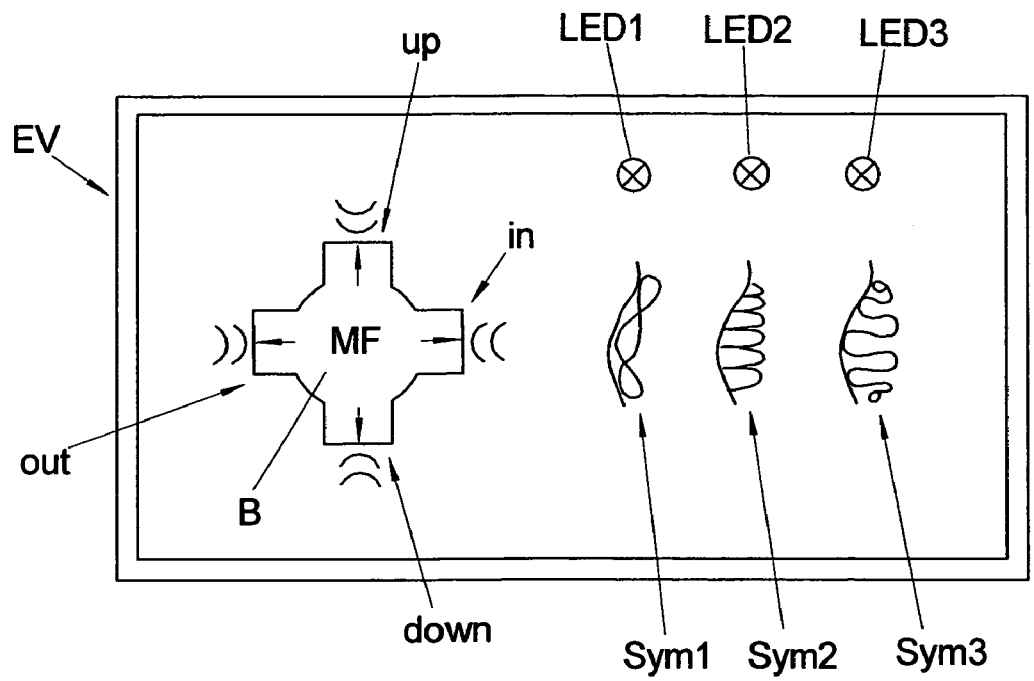
FIG. 4a and FIG. 4b show an actuation device with actuation elements.
Figure 4B:
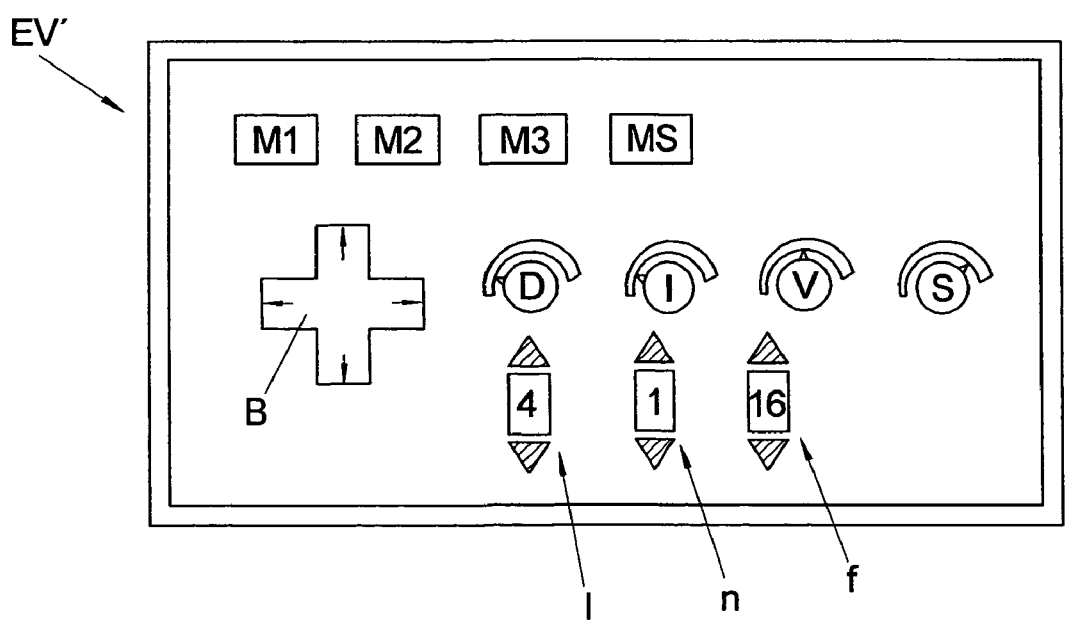

FIGS. 4a and 4b schematically depict an actuation device EV and an actuation device EV', respectively. FIG. 4a is a particularly simple embodiment that has only one operating element B into which the possible adjustments "up", "down", "in", and "out" of the lumbar support and the operating functions for a massage pattern MF are integrated. To select a massage pattern MF, the operating element B is pressed, said operating element B functioning as a button for this selection. With each selection pressed, a preprogrammed massage pattern MF can be selected, symbolized by respective schematic depictions Sym1, Sym2, and Sym3. It is understood that the invention is not to be interpreted as limited to the massage patterns depicted, nor to their number. In this exemplary embodiment, displays LED1, LED2, and LED3 are designed as light emitting diodes associated with each symbol Sym1, Sym2, and Sym3. For this purpose, a light emitting diode of an active massage function can switch to a blink mode to indicate this function. Moreover, the operating element B, by actuation pressure acting laterally, from above or from below enables the manual setting by the user of the desired, fixed nominal position of the lumbar support when the massage function is not in use.

The actuation arrangement depicted in FIG. 4b enables programming and storage of various massage functions by the user in addition to the manual adjustment of the desired fixed nominal position of the lumbar support known from FIG. 4a. For entry into storage 3 memory keys M1, M2, and M3 and a storage key MS are provided that enable entry into storage 3 of 3 different nominal positions of the lumbar support and the associated massage functions for 3 users of the motor vehicle seat. In each case, a dynamics regulator D, an interval regulator I, a vibration regulator V and a speed regulator S are provided. The amplitude of the massage in the seat back depth can be set using the dynamics regulator D. The interval regulator I enables setting the length and associated pause of the massage function. The vibration regulator V is used to regulate the amplitude of the overlaid oscillation from FIG. 5, whereas the speed regulator S enables setting the speed at which a massage pattern MF is run through. The other input elements l, n, and f are designed as "up/down" touch controls, whereby the associated value is displayed by a central decimal display. The input element e is used to set the number of loops, crossing points, or figure eights within the massage pattern MF. In contrast the input element n enables setting the number of passes through the desired curvature field. Additionally, the input element f enables user setting of the desired massage frequency that is preferably associated with the overlaid oscillation shown in FIG. 5.

The operating elements D, I, V, S, l, n, and f can be implemented as shown in FIG. 4b. An alternative and particularly advantageous embodiment shown in FIG. 4a provides the cost-cutting effective variant of the integration of the operating elements and the use of a display for the associated functions D, I, V, S, l, n, and f The invention is not restricted to the exemplary embodiments depicted, in particular to the massage patterns or the arrangement of the operating elements of the actuation arrangement.

The invention claimed is:

1. A method for controlling a lumbar adjustment device of a motor vehicle seat, the lumbar adjustment device having a first drive for adjustment in a first adjustment direction and a second drive for adjustment in a second adjustment direction, the method comprising:
   simultaneously and automatically controlling a drive movement in the first adjustment direction and a drive movement in the second adjustment direction, wherein the adjustment directions differ from each other, and wherein a second adjustment position is ascertained in the second adjustment direction, and the drive movement in the first adjustment direction is controlled as a function of at least one of the second adjustment position and a temporal change in the second adjustment position.

2. The method of claim 1, wherein the drive movement in the first adjustment direction is controlled as a function of the second adjustment position and a temporal change in the second adjustment position.

3. The method of claim 1, wherein the drive movement in the first adjustment direction and the drive movement in the second adjustment direction form a massage pattern, that is run through for a predefinable period of time.

4. The method of claim 3, wherein a massage figure is altered as a function of at least one characteristic value of the group consisting of:
   weight of seat occupant;
   massage time;
   trip duration;
   vehicle speed and its temporal change;
   frequency and extent of operation of a steering wheel;
   gas pedal operating path;
   clutch pedal operation;
   bad road detection;
   vehicle temperature;
   user identification; and
   operation of an actuating device.

5. The method of claim 1, wherein the motor vehicle seat includes a seat back having a lumbar support; wherein at least one of the first adjustment direction and the second adjustment direction lie in a plane of the seat back for a massage function along the lumbar support; and wherein the massage function is adjusted by controlling the adjustment movement in at least one of the first adjustment direction and the second adjustment direction as a function of measured position values.

6. The method of claim 5, wherein the first adjustment direction and the second adjustment direction lie in a plane of the seat back for a massage function along the lumbar support.

7. The method of claim 5, wherein the massage function is adjusted by controlling the adjustment movement in the first adjustment direction and the second adjustment direction as a function of measured position values.

8. The method of claim 1, wherein one adjustment movement is composed of the drive movements in the first adjustment direction and the second adjustment direction; and wherein the adjustment in the first adjustment direction is coordinated with the adjustment in the second adjustment direction.

9. The method of claim 1 or 8, wherein a first adjustment position is ascertained in the first adjustment direction; and wherein the drive movement in the second adjustment direction is controlled as a function of at least one of the first adjustment position and a temporal change in the first adjustment position.

10. The method of claim 9, wherein the drive movement in the second adjustment direction is controlled as a function of the first adjustment position and a temporal change in the first adjustment position.

11. The method of claim 9, wherein a coordination instruction is read out from storage, and a drive control variable pulse width modulation for dependent control of the drive is ascertained from at least one of the adjustment position and the temporal change in the adjustment position ascertained using the coordination instruction.

12. The method of claim 11, wherein the drive control variable pulse width modulation for dependent control of the drive is ascertained from the adjustment position and the temporal change in the adjustment position ascertained using the coordination instruction.

13. The method of claim 1, wherein at least one of a direction of movement, a speed of movement and an acceleration of movement of the first adjustment drive is coordinated with at least one of an adjustment position and a temporal change in the adjustment position of the second drive.

14. The method of claim 13, wherein a direction of movement, a speed of movement and an acceleration of movement of the first adjustment drive is coordinated with at least one of an adjustment position and a temporal change in the adjustment position of the second drive.

15. The method of claim 13, wherein at least one of a direction of movement, a speed of movement and an acceleration of movement of the first adjustment drive is coordinated with an adjustment position and a temporal change in the adjustment position of the second drive.

16. A method for controlling a lumbar adjustment device of a motor vehicle seat, the lumbar adjustment device having a first drive for adjustment in a first adjustment direction and a second drive for adjustment in a second adjustment direction, the method comprising:
simultaneously and automatically controlling a drive movement in the first adjustment direction and a drive movement in the second adjustment direction, wherein the adjustment directions differ from each other, wherein the lumbar adjustment device has a third drive for adjustment in a third adjustment direction differing from the first adjustment direction and second adjustment direction, and the drive movement of the third drive is controlled as a function of at least one of an adjustment position and a temporal change in the adjustment position of at least one of the first adjustment direction and the second adjustment direction.

17. The method of claim 16, wherein the drive movement of the third drive is controlled as a function of the adjustment position and the temporal change in the adjustment position of at least one of the first adjustment direction and the second adjustment direction.

18. The method of claim 16, wherein the drive movement of the third drive is controlled as a function of at least one of the adjustment position and the temporal change in the adjustment position of the first adjustment direction and the second adjustment direction.

19. A motor vehicle seat system having a lumbar adjustment device comprising:
a lumbar support adjustable at least in the seat back depth and the seat back height;
a first drive for adjustment in a first adjustment direction;
a second drive for adjustment in a second adjustment direction;
a computing unit for simultaneously and automatically controlling a drive movement in the first adjustment direction and in the second adjustment direction;
driver elements to control drive energy of the drives;
sensors to ascertain at least one of an adjustment position and a temporal change in the adjustment position; and
an input device.

20. The motor vehicle seat system of claim 19, further comprising sensors to ascertain the adjustment position and the temporal change in the adjustment position.

21. A method for controlling a lumbar adjustment device of a motor vehicle seat, the lumbar adjustment device having a first drive for adjustment in a first adjustment direction and a second drive for adjustment in a second adjustment direction, the method comprising:
simultaneously and automatically controlling a drive movement in the first adjustment direction and a drive movement in the second adjustment direction, wherein the adjustment directions differ from each other, wherein a force acting on at least one of the first and second drive is ascertained from at least one drive movement.

22. The method of claim 21, wherein a back contour of a seat occupant is determined by ascertaining the force acting on the drive.

23. The method of claim 22, wherein from the back contour, at least one of a contour-specific adjustment position, a contour-specific massage pattern and a contour-specific predefinable period of time for the massage is determined.

24. The method of claim 23, wherein from the back contour a contour-specific adjustment position, a contour-specific massage pattern and a contour-specific predefinable period of time for the massage is determined.

25. A lumbar adjustment device comprising:
a first drive for adjustment in a first adjustment direction;
a second drive for adjustment in a second adjustment direction;
a computing unit for automatically controlling a drive movement in the first adjustment direction and in the second adjustment direction;
driver elements to control drive energy of the first drive and the second drive; and
sensors to ascertain at least one of an adjustment position and a temporal change in the adjustment position;
wherein the adjustment directions differ from each other.

26. The device of claim 25, wherein the computing unit is programmable and at least one massage pattern is programmable and storable.

27. The lumbar adjustment device of claim 25, further comprising sensors to ascertain an adjustment position and a temporal change in the adjustment position.

28. The device of claim 25, wherein a plurality of massage patterns are at least one of the following: user selectable, changeable, and storable.

29. The lumbar adjustment device of claim 28, wherein a plurality of massage patterns are user selectable, changeable, and storable.

30. The device of claim 25 further comprising a transmitter for communication of a massage function via a bus system.

31. The device of claim 30, wherein the bus system is a local interconnect network-bus.

* * * * *

UNITED STATES PATENT AND TRADEMARK OFFICE
CERTIFICATE OF CORRECTION

PATENT NO.         : 7,172,247 B2                                    Page 1 of 1
APPLICATION NO.    : 10/636292
DATED              : February 6, 2007
INVENTOR(S)        : Klaus Beloch et al.

It is certified that error appears in the above-identified patent and that said Letters Patent is hereby corrected as shown below:

On the Title Page

(56) References Cited            Delete "Ftiz",
U.S. Patent Documents            Insert --Fitz--
pg. 2, Col. 1
6,213,553...

In the Claims

Column 16, line 36, Claim 24     Delete "is determined",
                                 Insert --are determined--

Signed and Sealed this

Seventeenth Day of June, 2008

JON W. DUDAS
*Director of the United States Patent and Trademark Office*